United States Patent [19]

Edmonson et al.

[11] Patent Number: 5,313,234
[45] Date of Patent: May 17, 1994

[54] LIQUID CRYSTAL PROJECTOR

[75] Inventors: Orvan Edmonson, Eagan, Minn.; Christopher Mathewson, Rochester, N.Y.

[73] Assignee: Sayett Group, Inc., Rochester, N.Y.

[21] Appl. No.: 6,144

[22] Filed: Jan. 19, 1993

Related U.S. Application Data

[63] Continuation of Ser. No. 736,246, Jul. 26, 1991, abandoned.

[51] Int. Cl.$^5$ .............................................. G03B 21/16
[52] U.S. Cl. .......................................... 353/61; 353/57
[58] Field of Search ............... 353/52, 54, 55–56, 353/60–61, 119–122, DIG. 3; 359/66, 79

[56] References Cited

U.S. PATENT DOCUMENTS

| | | | |
|---|---|---|---|
| 2,569,918 | 10/1951 | Berggren. | |
| 3,250,175 | 5/1966 | Braun | 353/61 |
| 4,088,400 | 5/1978 | Assouline et al. | 353/20 |
| 4,154,007 | 5/1979 | Judd | 340/711 |
| 4,165,160 | 8/1979 | Persha et al. | 353/55 |
| 4,167,310 | 9/1979 | Persha et al. | 353/52 |
| 4,222,641 | 9/1980 | Stolov | 353/84 |
| 4,294,524 | 10/1981 | Stolov | 353/84 |
| 4,368,963 | 1/1983 | Stolov | 353/31 |
| 4,386,836 | 6/1983 | Aoki et al. | 355/3 R |
| 4,453,810 | 6/1984 | Curiel | 353/55 |
| 4,536,014 | 8/1985 | Boutaleb et al. | 353/122 |
| 4,563,067 | 1/1986 | Ozeki | 353/60 |
| 4,613,207 | 9/1986 | Fergason | 359/36 |
| 4,652,101 | 3/1987 | Grunwald | 353/122 |
| 4,671,634 | 6/1987 | Kizaki et al. | 353/122 |
| 4,722,593 | 2/1988 | Shimazaki | 353/122 |
| 4,770,525 | 9/1988 | Umeda et al. | 353/122 |
| 4,787,737 | 11/1988 | Ogawa et al. | 353/60 |
| 4,811,064 | 3/1989 | Ohmura et al. | 353/122 |
| 4,824,210 | 4/1989 | Shimazaki | 353/119 |
| 4,864,390 | 9/1989 | McKechnie et al. | 358/60 |
| 4,875,064 | 10/1989 | Umeda et al. | 353/78 |
| 4,880,303 | 11/1989 | Grunwald | 353/122 |
| 4,882,599 | 11/1989 | Grunwald | 353/60 |
| 4,950,072 | 8/1990 | Honda | 353/61 |

FOREIGN PATENT DOCUMENTS

| | | | |
|---|---|---|---|
| 2553552 | 4/1985 | France | 353/55 |
| 61-246731 | 6/1987 | Japan. | |
| 0959018 | 9/1982 | U.S.S.R. | 353/55 |

Primary Examiner—William A. Cuchlinski, Jr.
Assistant Examiner—William C. Dowling
Attorney, Agent, or Firm—Cumpston & Shaw

[57] ABSTRACT

A liquid crystal display panel projector including a housing having a thermally isolated hot compartment which has an illumination source and a cold compartment which retains liquid crystal display panel. The housing includes individual cooling fluid paths for the hot and cold compartments. The display panel is disposed in the cold compartment where it is isolated from the thermal energy of the illumination source to provide a substantially stable thermal environment.

7 Claims, 3 Drawing Sheets

LIQUID CRYSTAL PROJECTOR

This is a continuation of copending application Ser. No. 07/736,246 filed Jul. 26, 1991 now abandoned.

The present invention relates to liquid crystal projectors, and more particularly, to a liquid crystal projector having thermally isolated optically transparent compartments within the projector for providing a thermally stable environment for a liquid crystal display panel.

BACKGROUND OF THE INVENTION

Liquid crystal projectors employ a liquid crystal display panel positionable between a projector lamp and a lens. An illumination beam from the lamp passes through the liquid crystal display panel to form an image beam. The image beam is enlarged by a projection lens system and focused to cast an enlarged picture on a display screen.

To provide maximum contrast of the displayed image, liquid crystal display panels must be maintained at a cool and uniform temperature. The exposure of the display panel to heat from the projection lamp substantially degrades the quality of the projected image.

A prior projector employing a liquid crystal display panel is disclosed in U.S. Pat. No. 4,875,064 to Umeda. In the Umeda projector, the illumination beam passes through ultraviolet reflectors and absorbers to remove thermal energy from the beam. A reflective mirror redirects the illumination beam so that the beam is perpendicular to the lamp. A condenser lens directs the illumination beam to the liquid crystal display panel. The display panel forms an image beam which passes through a fresnel lens, and is redirected by a mirror. The image beam then passes through a projection lens, off a projection mirror, and on to a projection screen. While the Umeda device provides a relatively compact projector and employs ultraviolet reflectors and absorbers, the liquid crystal display panel is located in the same thermal environment as the illumination source, and is therefore subject to substantial heat and temperature fluctuations which degrade the quality of the image and contribute to premature failure of the panel.

A need exists for a liquid crystal display panel projector which provides a cool, thermally stable environment for the display panel. There is also a need for a compact projector having a reduced volume to permit integration with control equipment.

SUMMARY OF THE INVENTION

A liquid crystal display panel projector having a thermally isolated liquid crystal display panel and illumination source is disclosed. The thermal isolation of the display panel and the illumination source is achieved by housing each within a thermally separate compartment in the projector and circulating a cooling liquid through the compartments.

The projector of the present invention includes a housing having a hot compartment and a thermally isolated cold compartment, wherein the illumination source is disposed in the hot compartment and the liquid crystal display panel is disposed in the cold compartment. The cold compartment provides a relatively cool and substantially uniform temperature environment for the liquid crystal display panel. The stability of the environment in the cold compartment improves the contrast of the image produced by the display panel.

The hot and cold compartments are thermally isolated by removing the thermal energy from the illuminating beam while it is in the hot compartment, and preventing fluid communication from the hot compartment to the cold compartment.

The present invention may be used with liquid crystal display panels including color filter TFT, black and white double twisted, STN, and TFT panels. In addition, the present invention employs double folded optics to reduce the size of the projector, The compact design of the projector allows for the incorporation of a computer including a mother board, a disk drive and a backup system to provide a stand alone computer image projection system.

Specifically, the present invention includes a liquid crystal display panel projector comprising:

(a) a housing including a cold compartment having a fluid inlet and a hot compartment having a fluid outlet, wherein the hot compartment is at least partially thermally isolated from the cold compartment;

(b) a display panel substantially disposed within the cold compartment such that the cold compartment, the display panel having a first side and a second side;

(c) illumination means in the hot compartment for producing an illumination beam;

(d) single pass optics means for directing the illumination beam from the illumination means through the display panel in a single pass to produce an image beam;

(e) focusing means for projecting the image beam upon the screen; and (f) fluid communication means extending between the inlet and the outlet for providing a fluid flow from the inlet into cold compartment in direct thermal contact with the first and the second side of the display panel such that the fluid flow then passes through the hot compartment in thermal contact with the illumination means and exits the housing through the outlet.

DETAILED DESCRIPTION OF THE PREFERRED EMBODIMENT

Figure 1:
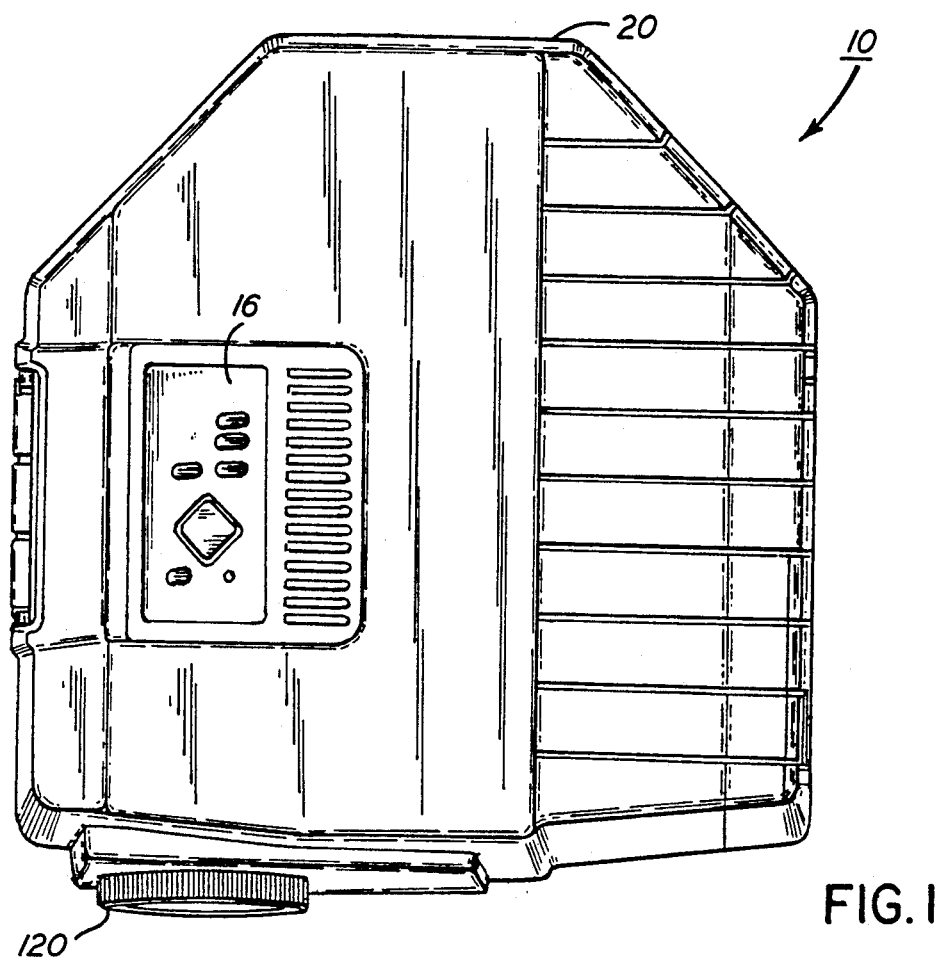
FIG. 1 is a top plan view of the projector of the present invention.
Figure 2:
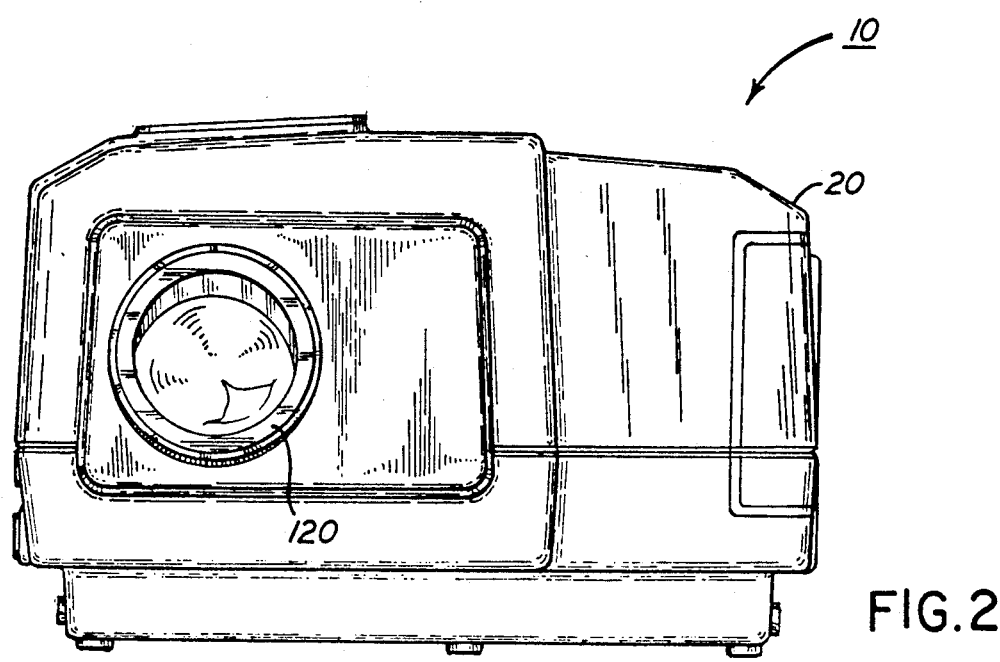
FIG. 2 is a front elevational view of the projector.
Figure 3:
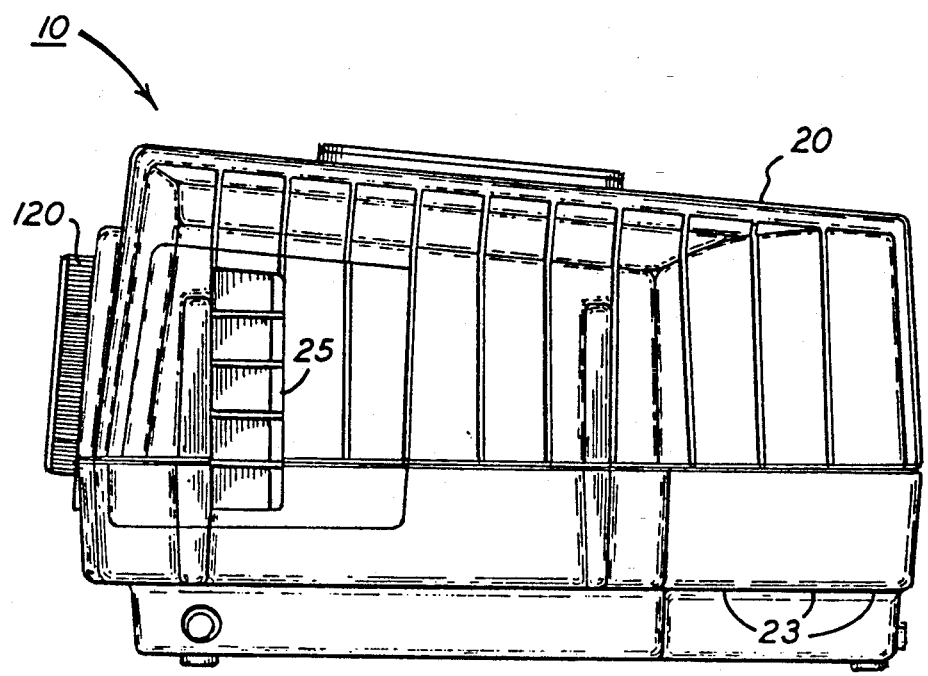
FIG. 3 is a side elevational view of the projector housing.
Figure 4:
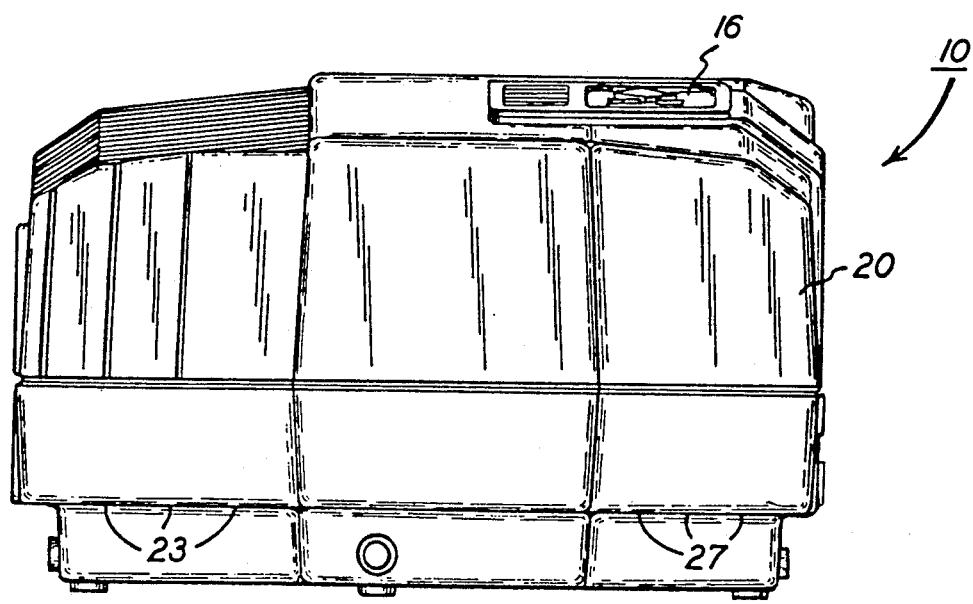
FIG. 4 is a rear elevational view of the projector.

Referring to FIGS. 1-3, the projector 10 of the present invention includes a housing 20. A projector lens 120 is retained by the housing 20. As shown in FIGS. 1 and 4, the housing 20 may include a control panel 16 including on/off, and focusing controls.

Figure 5:
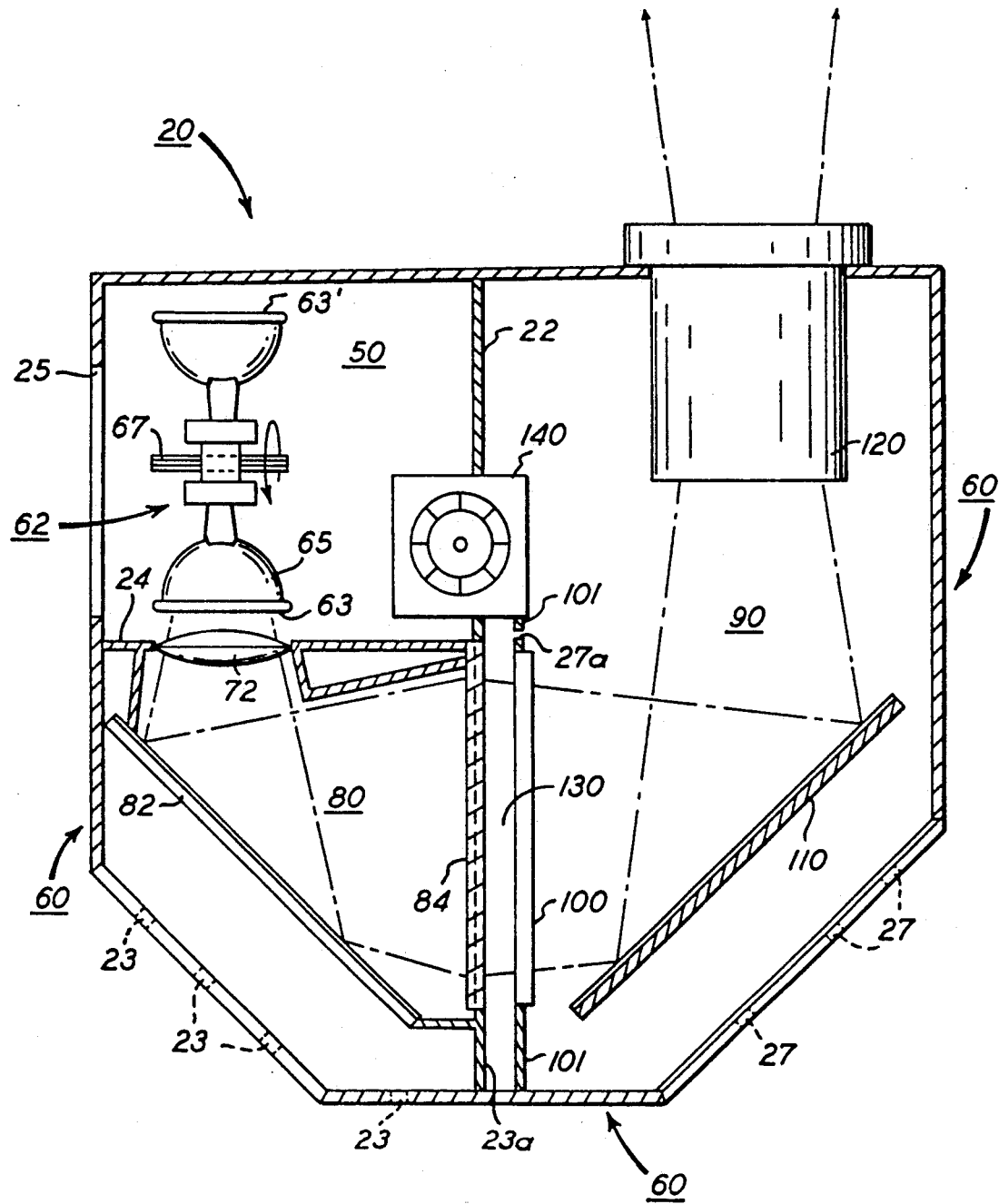
FIG. 5 is a schematic cross-sectional view taken along lines 5—5 of FIG. 3.

Referring to FIG. 5, the housing 20 includes a hot compartment 50 and a cold compartment 60. The hot compartment 50 is separated from the cold compartment 60 by a thermally insulating interior housing walls 22 and 24. The insulating walls 22, 24 may be formed of a variety of materials, such as insulated aluminum. The cold compartment 60 includes an illumination optics chamber 80 and an imaging optics chamber 90. As shown in FIG. 5, a light path whose boundaries are shown by broken arrows, extends from the hot compartment 50 through the illumination optics chamber 80 and imaging optics chamber 90 to exit the housing 20 through the projection lens 120.

Referring to FIG. 5, the housing 20 includes a fan 140 between the hot compartment 50 and the cold compartment 60. As shown in FIGS. 1 and 5, the hot compartment 50 includes an exhaust port 25. Referring to FIG. 5, the interior insulating wall 24 separates the hot compartment 50 from the illumination optics chamber 80. The interior insulating wall 22 and fan 140 separate the hot compartment 50 from the imaging optics chamber 90. Referring to FIGS. 3-5, the illumination optics chamber 80 includes inlet vents 23 along the periphery of the housing 20.

As shown in FIG. 5, a fluid passageway 130 separates the illumination optics chamber 80 from the imaging optics chamber 90. The inlet vents 23 are fluidly connected to the passageway 130 by outlet vents 23a. Referring to FIGS. 4 and 5, the imaging optics chamber 90 includes inlet vents 27, and as shown in FIG. 5, outlet vents 27a. Preferably, the outlet vents 27a discharge into the passageway 130 proximal to the fan 140.

The fan 140 intakes fluid from the passageway 130, and exhausts fluid into the hot compartment 50.

Referring to FIG. 5, the hot compartment 50 includes the illumination source 62, and a hot condenser lens 72.

As shown in FIG. 5, the illumination source 62 produces an illumination beam which travels along the light path. The illumination source 62 includes a halogen or metal-halide projection lamp 63 and a reflector 65 for directing the light emitted from the lamp 63 along the light path. The reflector 65 is parabolic for reflecting the light from the lamp 63 in substantially parallel beams along the light path.

The illumination source 62 includes a dual lamp system having a pair of parallely aligned diametrically oriented lamps 63, 63', which may be selectively rotated about a central axis 67 to orient either lamp in an operable position with respect to the light path. The dual lamps provide for efficient switching of the bulbs. That is, as one bulb burns out, the remaining bulb may be immediately rotated into operable position, thereby reducing down time of the system. In addition to manual rotation of the lamps, an automatic switch (not shown) may be used to rotate the lamps 63, 63' based upon a percentage of the rated useful life of the bulb or upon actual failure of one bulb. The dual lamp system allows for alternating use of a long life-normal brightness lamp and high intensity-short life bulb.

The hot condenser lens 72 is disposed perpendicular to the light path in the wall 24 to intersect the illumination beam. The hot condenser lens 72 removes thermal energy from the illumination beam by reflecting infrared radiation back into the hot compartment 50 while permitting visible light in the illumination beam to pass into the illumination optics chamber 80. A preferred hot condenser lens 72 is a Pyrex mirror coated with an infrared reflector as is well known in the art.

As shown in FIG. 5, the illumination optics chamber 80 includes the first surface mirror 82 oriented obliquely to both the light path and the hot condenser lens 72 and a fresnel lens 84. The orthogonal of the first surface mirror 82 may be at any angle from approximately 35° to 55° from the orthogonal of the hot condenser lens 72, with a preferred orientation of approximately 45°. The first surface mirror 82 reflects visible light in the illumination beam towards the fresnel lens 84.

Referring to FIG. 5, the fresnel lens 84 is disposed in the light path subsequent to the first surface mirror 82 and oriented perpendicular to the light path. The illumination beam passes substantially orthogonally through the fresnel lens 84. As shown in FIG. 5, the fresnel lens 84 may form a portion of the wall of the illumination optics chamber 80, such that the fresnel lens defines a portion of the fluid passageway 130.

As shown in FIG. 5, the imaging optics chamber 90 includes a liquid crystal display panel 100, a first surface mirror 110, and a projection lens 120.

Referring to FIG. 5, the liquid crystal display panel 100 is disposed in the cold compartment 90 and opposes the fresnel lens 84 across the passageway 130. The display panel 100 is retained by peripheral mounting plate 101. The mounting plate 101 includes the peripheral outlet ports 27a proximal to the fan 140 for allowing cooling fluid to pass therethrough.

The display panel 100 may be of any of a variety of types including color filter TFT, black and white double twisted, STN and TFT panels. The display panel 100 is parallel to the fresnel lens 84 and perpendicular to the light path. As shown in FIG. 5, the display panel 100 and plate 101 may form a portion of the wall of the imaging optics chamber 90 such that the panel is in thermal contact with cooling fluid in the passageway 130.

Referring to FIG. 5, the first surface mirror 110 is obliquely oriented with respect to the light path subsequent to the display panel 100. The orthogonal of the first surface mirror 110 may be from approximately 35° to 55° from both the light path and the orthogonal of the display panel 100, with a preferred orientation of approximately 45°. The first surface mirror 110 may be of any type of visible light reflecting mirror well known in the art.

As shown in FIG. 5, the projection lens 120 is retained in the wall of the housing 20 in the cold compartment 90 such that the optical axis of the projection lens 120 is coincident with the light path. The light path from the first surface mirror 110 passes through the projection lens 120 and exits the projector 10. The projection lens 120 focuses the image beam for projection upon an external screen. The projection lens 120 may be any lens system a-s well known in the art.

OPERATION OF THE PROJECTOR

As shown in FIG. 5, the light path in the present invention extends from the illumination source 62 to the projection lens 120 such that the illumination source and the projection lens are disposed towards the screen end of the projector 10, wherein the illumination source directs the illumination beam away from the screen, while the projection lens is pointed at the screen, not shown. The light path thereby defines a double folded optic path.

Light from the illumination source 62 is reflected by the parabolic reflector 65 to form the illumination beam along the light path. The illumination beam orthogonally passes through the hot condenser lens 72. The hot condenser lens 72 reflects a majority of the thermal energy, such as infrared radiation, back into the hot compartment 50. The illumination beam, passes into cold compartment 60 by way of the illumination optics chamber 80 and intersects the first surface mirror 82 such that the visible light is directed along the light path towards the fresnel lens 84. The illumination beam then orthogonally passes through the fresnel lens 84 and is focused for passage along the light path into the imaging optics chamber 90.

The illumination beam passes through the passageway 130 and orthogonally intersects the display panel 100 in the imaging optics chamber 90. As the illumination beam passes through the display panel 100, the image on the display panel is transferred into the beam to form an image beam. The image beam travels along the light path and is reflected by the first surface mirror 110 to the projection lens 120.

The projection lens 120, as well known in the art, focuses the image beam for projection upon a screen not shown.

The cooling of the hot and cold compartments 50, 60 is accomplished by circulating a cooling fluid, such as ambient air, through the individual compartments of the housing 20.

The fan 140 draws in ambient air through the inlet vents 23 and 27, and discharges the air over the hot illumination source 62, which is the hottest temperature in the system. The air then exhausts through the exhaust port 25. The energy from the illumination source 62 is substantially retained within the hot compartment 50 and transferred to the cooling air flow. By providing the hottest element of the projector, the illumination source 62, as the last element in the cooling fluid flow path, the cooling fluid will remove the maximum amount of heat energy from the projector.

Specifically, ambient air is drawn into the illumination optics chamber 80 through vents 23. The ambient air exits the illumination optics chamber 80 through outlet vents 23a, and passes into the passageway 130. The air in the passageway 130 is in direct thermal contact with a first side of the display panel 100. After contacting the first side of the display panel 100, the air enters the fan 140, to be discharged across the illumination source 62 in the hot compartment 50.

Additional fluid flow is drawn in through vents 27 in the imaging optics chamber 90. Fluid flow passes through the vents 27 and directly thermally contacts a second side of the display panel 100. The fluid flow passes through the ports 27a in the mounting plate 101, and is drawn into the fan 140. The fan then discharges the fluid flow from the first and second side of the display panel 100 into the hot compartment 50. The fluid flow passes over the illumination source 62 and is discharged through port 25.

The fluid flow path thereby provides a cooling fluid flow across each surface of the display panel 100, while providing the total cooling fluid flow rate to pass over the illumination source 62. The projector 10 thereby defines a cooling fluid flow path which includes the passageway 130 and the imaging optics chamber 90. As the display panel 100 is in thermal contact with the passageway 100 and the imaging optics chamber 90, the cooling fluid passing through the flow path removes heat from both sides of the display panel.

The isolation of the hot compartment 50 and the cold compartment 60 by the insulating walls 22, 24 substantially retains the majority of the thermal energy produced by the illumination source 62 within the hot compartment.

It is important that the high temperature air exhausted from the hot compartment 50 is not drawn into the housing through inlet vents 23, 27 or passageway 130. Therefore, the inlet ports 23, 27 are distal to the exhaust port 25 of the hot compartment 50.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A liquid crystal display projector comprising:
   (a) a housing having a hot compartment including a fluid inlet and a fluid outlet spaced apart from the fluid inlet and a cold compartment including a fluid inlet and a fluid outlet wherein the cold compartment is at least partially thermally isolated from the hot compartment, and the fluid outlet of the cold compartment is in communication with the fluid inlet of the hot compartment;
   (b) an illumination source within the hot compartment between the fluid inlet and the fluid outlet so that fluid flow through the hot compartment from the fluid inlet to the fluid outlet cools the illumination source, the source producing an illumination beam, and means in the illumination beam for removing heat from the beam before it passes from the hot compartment to the cold compartment;
   (c) a fluid flow path extending from the inlet in the cold compartment through the cold compartment then through the inlet in the hot compartment past the illumination source to the outlet in the hot compartment;
   (d) a liquid crystal display panel in the cold compartment the display panel having a first and a second side, at least one of the sides in the thermal contact with the flow path;
   (e) means for conducting a cooling fluid through the flow path from the inlet in the cold compartment to the outlet in the hot compartment; and
   (f) means for directing the illumination beam from the illumination source to the display panel to produce an image beam.

2. The liquid crystal display projector of claim 1, further comprising focusing means for focusing the image beam upon a screen.

3. A projector for a display panel, comprising:
   (a) a housing having thermally isolated first and second compartments;
   (b) cooling means for causing a cooling fluid to flow along a flow path sequentially from an inlet, through the second compartment, into the first compartment through the first compartment and exhausting the fluid from an outlet in the first compartment;
   (c) an illumination source in the first compartment in the fluid flow path for producing an illumination beam and thermal energy and transferring the thermal energy to the cooling fluid;
   (d) heat retention means in a thermally conductive path between the first and second compartments for retaining a portion of the thermal energy produced by the illumination source within the first compartment;
   (e) a display panel in the second compartment; and
   (f) reflection means for passing the illumination beam from the illumination source through the display panel.

4. A projector for projecting an image on a liquid crystal display panel onto a screen, comprising:
   (a) a housing having substantially thermally isolated first and second compartments wherein a light path extends from the first compartment through the second compartment;
   (b) a cooling passageway in the second compartment;

(c) a light source in the first compartment for projecting visible light along the light path;

(d) an infrared reflector condenser lens in the first compartment disposed in the light path for reflecting a portion of the radiation produced by the light source while permitting the passage of visible light;

(e) a first surface mirror in the second compartment for directing visible light in the light path towards the passageway;

(f) a fresnel lens disposed in the light path for focusing the illumination beam;

(g) a liquid crystal display panel in the second compartment disposed in the light path such that a first surface of the display panel thermally contacts a portion of the cooling passageway and a portion of the illumination beam passes through the liquid crystal display to form an image beam;

(h) a second first surface mirror in the second compartment for reflecting the image beam; and (i) focusing means in the second compartment for focusing the image beam upon an imaging surface.

5. The projector of claim 4, further comprising means for removing heat from the first compartment.

6. A projector for projecting an image from a display panel onto a screen, comprising:

(a) a housing including a cold compartment having a fluid inlet and a hot compartment having a fluid outlet, wherein the hot compartment is at least partially thermally isolated from the cold compartment;

(b) a display panel substantially within the cold compartment, the display panel having a first side and a second side;

(c) illumination means in the hot compartment for producing an illumination beam;

(d) optics means for directing the illumination beam from the illumination means through the display panel to form an image beam;

(e) focusing mean for projecting the image beam upon the screen; and (f) a fluid communication pathway extending between the inlet and the outlet for providing continuous fluid flow from the inlet into the cold compartment in direct thermal contact with at least one of the first and the second sides of the display panel then passing through the hot compartment in thermal contact with the illumination means and then exiting the housing through the fluid outlet.

7. A method for projecting an image beam from a liquid crystal display panel upon a screen, comprising:

(a) producing an illumination beam in a first compartment of a housing the first compartment having a cooling fluid outlet;

(b) single passing the illumination beam through a liquid crystal display panel in a second compartment to form the image beam the second compartment having a cooling fluid inlet;

(c) thermally isolating the first compartment from the second compartment; and (d) removing heat from the illumination beam as it passes from the first compartment to the second compartment;

(e) passing a flow of cooling air sequentially from the inlet in the second compartment, by the liquid crystal display panel, then into the first compartment and then through the first compartment to an outlet in the first compartment; and (f) focusing the image beam upon the screen.

* * * * *